US010478008B2

United States Patent
Nabeiro (10) Patent No.: US 10,478,008 B2
(45) Date of Patent: *Nov. 19, 2019

(54) MACHINE FOR PREPARING BEVERAGES COMPRISING AN OPENING DISPOSITION AND PROCESS FOR PREPARING A BEVERAGE WITH ANTICIPATED OPENING

(71) Applicant: NOVADELTA—COMÉRCIO E INDÚSTRIA DE CAFÉS S.A., Lisbon (PT)

(72) Inventor: Rui Miguel Nabeiro, Campo Maior (PT)

(73) Assignee: NOVADELTA—COMÉRCIO E INDÚSTRIA DE CAFÉS S.A., Lisbon (PT)

( * ) Notice: Subject to any disclaimer, the term of this patent is extended or adjusted under 35 U.S.C. 154(b) by 0 days.

This patent is subject to a terminal disclaimer.

(21) Appl. No.: 15/513,463

(22) PCT Filed: Sep. 22, 2015

(86) PCT No.: PCT/PT2015/050007
§ 371 (c)(1),
(2) Date: Mar. 22, 2017

(87) PCT Pub. No.: WO2016/048181
PCT Pub. Date: Mar. 31, 2016

(65) Prior Publication Data
US 2017/0303726 A1 Oct. 26, 2017

(30) Foreign Application Priority Data
Sep. 23, 2014 (PT) ........................................ 107898

(51) Int. Cl.
*A47J 31/36* (2006.01)

(52) U.S. Cl.
CPC ....... *A47J 31/3628* (2013.01); *A47J 31/3661* (2013.01)

(58) Field of Classification Search
CPC ...... A47J 31/36; A47J 31/628; A47J 31/3628; A47J 31/3661
(Continued)

(56) References Cited

U.S. PATENT DOCUMENTS 2,935,929 A * 5/1960 Di Cara ............... A47J 31/3661
141/329
3,607,297 A 9/1971 Fasano
(Continued)

FOREIGN PATENT DOCUMENTS

EP 1 541 070 A1 6/2005
EP 2848167 * 3/2015 ............. A47J 31/36
(Continued)

OTHER PUBLICATIONS

International Search Report for PCT/PT2015/050007 dated Dec. 18, 2015 [PCT/ISA/210].
(Continued)

*Primary Examiner* — Viren A Thakur
*Assistant Examiner* — Chaim A Smith
(74) *Attorney, Agent, or Firm* — Sughrue Mion, PLLC (57) ABSTRACT

A machine (1) for preparing aromatic beverages by means of extraction of a respective substance, such as espresso coffee and similar, that comprises at least one extraction device (3) adapted for extracting an single dose of said substance provided in a package (2), for example in the form of a substantially rigid capsule or substantially flexible pod, and a previous opening disposition (5) disposed upstream of the extraction device (3) and adapted to provide passageways (53) in the single dose packages (2) before the latter are supplied to the extraction device (3). A process for preparing
(Continued)

beverages with anticipated opening of a package (2) by means of the previous opening disposition (5) disposed upstream of the extraction device (3).

12 Claims, 4 Drawing Sheets

(58) Field of Classification Search
USPC .................. 426/431; 222/81, 83, 85, 87
See application file for complete search history.

(56) References Cited

U.S. PATENT DOCUMENTS

2010/0107890 A1    5/2010  Zanetti
2017/0295986 A1\*  10/2017  Nabeiro .............. A47J 31/3647

FOREIGN PATENT DOCUMENTS

| FR | 2140619 A1 | 1/1973 | |
| WO | 2013/157025 A1 | 10/2013 | |
| WO | 2013/169134 | \* 11/2013 | .............. A47J 31/36 |
| WO | 2013/169134 A2 | 11/2013 | |

OTHER PUBLICATIONS

Written Opinion for PCT/PT2015/050007 dated Dec. 18, 2015 [PCT/ISA/237].

\* cited by examiner

MACHINE FOR PREPARING BEVERAGES COMPRISING AN OPENING DISPOSITION AND PROCESS FOR PREPARING A BEVERAGE WITH ANTICIPATED OPENING

CROSS REFERENCE TO RELATED APPLICATIONS

This application is a National Stage of International Application No. PCT/PT2015/050007, filed on Sep. 22, 2015, which claims priority from Portuguese Patent Application No. 107898, filed on Sep. 23, 2014, the contents of all of which are incorporated herein by reference in their entirety.

FIELD OF THE INVENTION

The present invention refers to the field of machines for the preparation of aromatic beverage by means of extraction of a respective substance, in particular machines adapted for processing single doses of said substance in extraction devices adapted for such purpose.

The present invention further refers to a process beverage preparation including a step of anticipated opening of said single dose package.

BACKGROUND OF THE INVENTION

Beverage preparation machines have been known for some time, in particular coffee machines by means of extraction, presenting at least one extraction device adapted to extract a beverage from an edible substance, for example roasted and grind coffee, supplied to said extraction device in a substantially hermetic single dose package, for example in the form of rigid capsule or flexible pod. In this particular, the hermetic property of the package is an essential condition so as to ensure the conservation of the aromatic properties of said edible substance.

In this context, the prior art includes many solutions relating to perforating the hermetic envelope of said single dose package so as to enable fluid to flow across thereof, in particular the entry of pressurized hot water inside of the package. In most of the cases said perforation of the single dose package is carried out immediately before starting to inject pressurized hot water, by means of perforating means provided inside of said extraction device.

Moreover, the prior art includes solutions relating to beverage preparation machines that present means for successively supplying single dose packages to an extraction device. In this type of machine there should also be considered the issue of the actuation of said single dose packages, usually provided in a common support of a strip type or similar, so as to supply these successively to an extraction device.

Document U.S. Pat. No. 3,143,954 discloses a beverage preparation machine that presents an actuation device adapted for moving a strip carrying a plurality of single doses successively to an extraction device. Said actuation device of the strip of single doses is disposed upstream of the extraction device and presents four actuation sides adapted for successively interacting with each of said sides with a single dose of the strip of doses. In this type of solution the strip of doses is provided in non-hermetic material, for example in the form of filter paper or similar, not requiring perforation means for producing entry and/or exit passages for the extraction flow.

Document U.S. Pat. No. 3,213,777 presents a machine of similar type that presents a similar traction mechanism, also provided so as to circulate a strip of doses by means of traction thereof along an ascending movement, from an upstream vertical direction to a downstream horizontal direction. This type of general disposition requires a bigger actuation force of the traction mechanism given that the latter operates in the direction opposite the direction of the gravity force.

Document U.S. Pat. No. 3,812,273 discloses a method for preparation of individual doses of aromatic beverages in a machine, whereby said method comprises a plurality of steps including providing single dose packages that present an open side, closing the open side by means of sealing sheet applied in removable manner, storing said packages in a storage zone of the machine, selecting the individual packages from the storage zone, conducting the selected packages to an extraction device, and, when inside the extraction device, removing the sealing sheet and perforating the top part of the package and introducing water. In particular, said sealing sheet is removed when the package is conducted to an extraction device. Moreover, the document discloses a machine that presents an anticipated perforating disposition of exit passages in the single dose packages before the latter are supplied to the extraction device.

Document WO 2013/169134 A2 registered by the applicant of the present invention discloses a machine for preparing beverages of the same type and adapted for processing a conduction support that provides a substantially hermetic envelope to a plurality of single doses. Said machine further comprises actuation means of said conduction support adapted so as to supply said doses successively to a respective extraction device, thereby resulting in a general compact disposition where the extraction device is disposed in relative proximity underneath of the exit of storage means and actuates the conduction support from a horizontal direction upstream to a vertical direction downstream, favoring the action of gravity force.

None of the documents in the prior art discloses a solution that avoids the need for producing holes in the interior of the extraction device and that presents an anticipated opening disposition of flow passages in single dose packages, before of the supply thereof to an extraction device, with reduced complexity and high operation reliability.

GENERAL DESCRIPTION OF THE INVENTION

The objective of the present invention is to provide a machine for preparing beverages, notably by means of extraction of aromatic substances such as for example espresso type coffee, tea and similar, provided in single dose packages such as for example substantially rigid capsules, substantially flexible pods and similar, that provides an opening in said single dose packages with more reliability and less technical complexity.

This objective is attained according to the present invention by means of a machine for preparing beverages according to claim 1.

An associated objective of the present invention is to provide an integrated solution for opening packages and for actuating a support of packages to be successively supplied to an extraction device.

Another objective of the present invention is to provide a process for preparing beverages that provides better operation reliability and more consistent quality level of the beverages.

This objective is solved according to claim 13.

DESCRIPTION OF THE FIGURES

The invention shall now be explained in greater detail based upon preferred embodiments and in the attached figures.

The Figures show, in simplified schematic representations.

DETAILED DESCRIPTION OF THE INVENTION

Figure 1A:
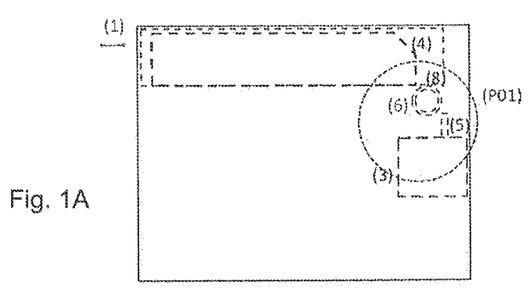
FIG. 1: side and front views (on the left and on the right, on the top) of a machine (1) for preparing beverages according to the invention, in an embodiment adapted for processing single dose packages (2) are linked to be in a strip, as well as detail view (P01) of a respective actuation device (6) (bottom)
Figure 1B:
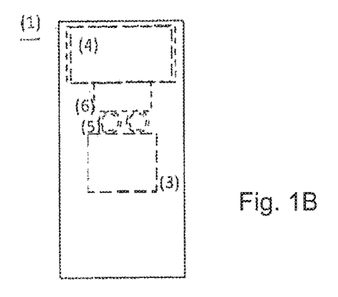
Figure 1C:
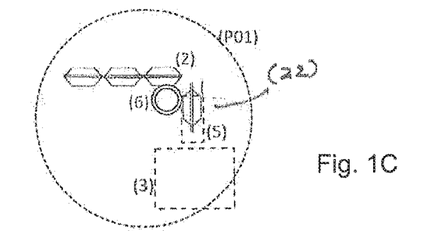

FIG. 1 shows a first embodiment of a machine (1) for preparing beverages of the type according to the present invention, including an extraction device (3) adapted for processing individual ones of a plurality of linked single dose packages (2) that are linked to be in a strip. In particular, FIG. 1 represents an embodiment of a machine (1) that presents an opening disposition (5) and an actuation device (6) provided as separate elements and disposed successively upstream and in the supply path to an extraction device (3) adapted for extraction of single dose packages (2). Moreover, both the opening disposition (5) and the actuation device (6) are provided as elements that can be actuated in rotation around a respective horizontal axis.

Figures 2A, 2B:
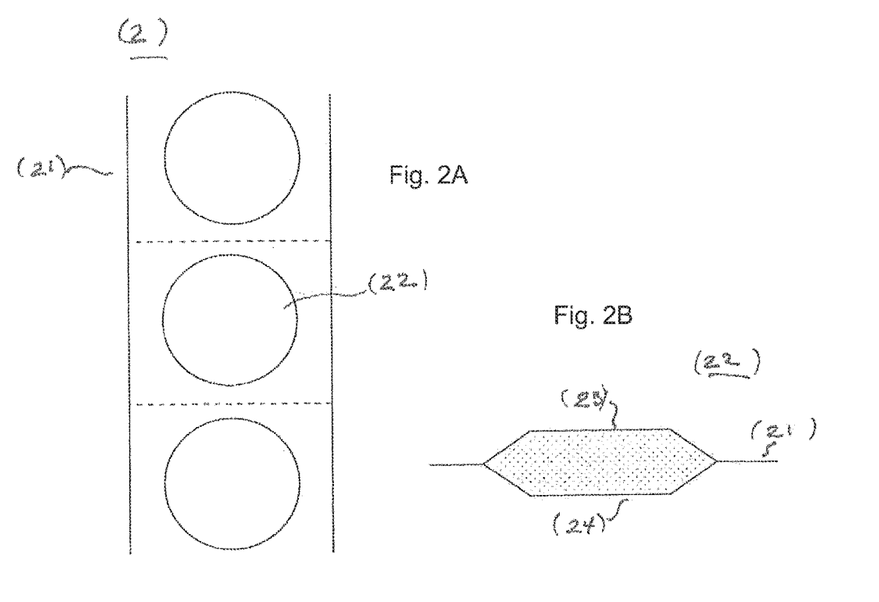
FIGS. 2*a*-2*b*: top view (FIG. 2*a*) and side view (FIG. 2*b*) of a plurality of linked single does packages adapted to be used in the embodiment of machine (1) for preparing beverages according to FIG. 1.

As one can observe in FIG. 2, said plurality of linked single dose portions (22) in a strip (2) are in this case configured as flexible pods provided in support (21) of single portions configured in form of strip or similar, and comprising a plurality of single dose portions (22) presenting at least two package walls (23, 24) substantially hermetic to air. In particular, the plurality of single dose portions (22) is provided without passageways (25) in any of its package walls (23, 24).

Said support (21) of single portions (22)(see FIG. 1) is housed inside of a support package (4) that engages in a part of the machine (1) so that said support (21) of single portions (22) can be displaced out of said support package (4) by means of an actuation device (6) so as to successively supply said single dose portions (22) to said extraction device (3). As one can better observe in detail P01 in FIG. 1*c*, said actuation device (6) is provided as a rotation element, for example of pulley type, rotatable around a horizontal axis, and actuated so as to rotate said support (21) of single portions (22) step-by-step and downwards, until a single dose portion (22) furthest downstream is physically separated and supplied under the action of the gravity force to said extraction device (3).

FIG. 1 further represents on a merely illustrative manner, an opening disposition (5) indicated as a disposition separate from the remanding and disposed in the path of said support (21) of single portions and upstream of said extraction device (3). According to a first inventive aspect, said opening disposition (5) is provided so that it can be actuated in rotation around a substantially horizontal or vertical axis, as it shall explained in greater detail in two embodiments further below.

Figure 3:
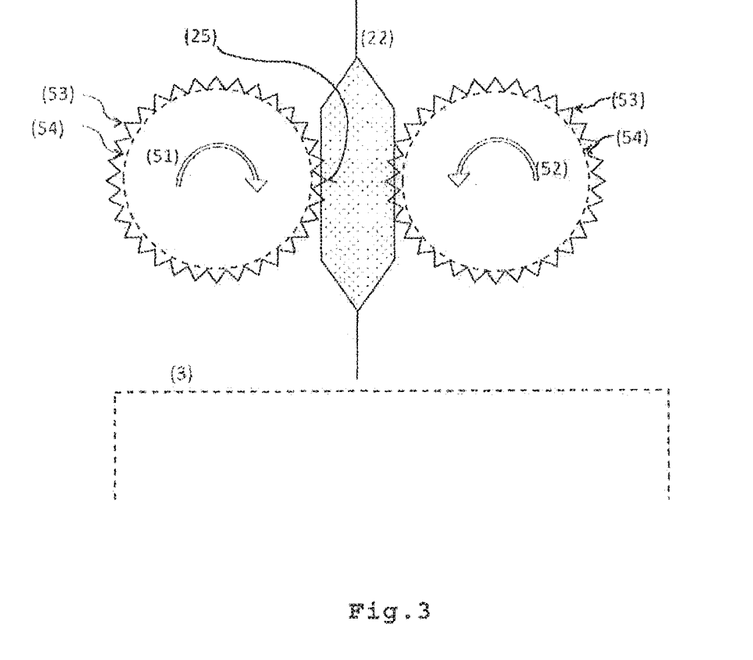
FIG. 3: side views of a first embodiment of an opening disposition (5) in a machine (1) for preparing beverages according to the invention.

FIG. 3 represents a first embodiment of said opening disposition (5), represented schematically and disposed upstream of said extraction device (3)—only partially represented and indicative of the relative position. In this case, it is a front view of the machine (1) for preparing beverages so that the axis of rotation of said opening disposition (5) develops along the depth direction of the machine (1).

As one can observe, the opening disposition (5) is in this case provided—and adapted so as to provide at least one, preferentially a plurality of passageways (25) in both package walls (23, 24) of said single dose portions (22). In particular, the opening disposition (5) comprises two opening parts (51, 52) provided as cylindrical elements with a side perimeter surface presenting a plurality of opening protrusions (53) and arranged in direct opposition at such a distance that the passage of a single dose portion (22) in between shall produce said passageways (25).

Figure 4A:
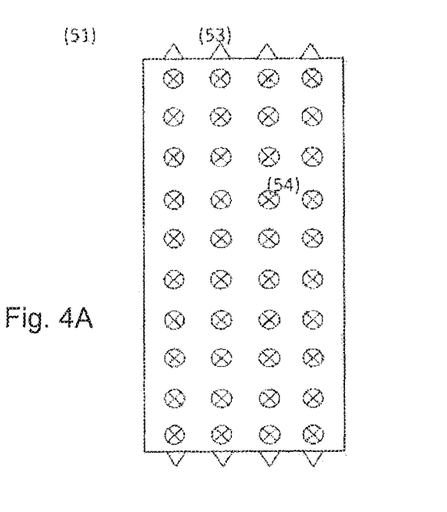
FIGS. 4*a*-4*b*: front view of the opening parts (52, 53) of the opening disposition (5) according to FIG. 3.
Figure 4B:
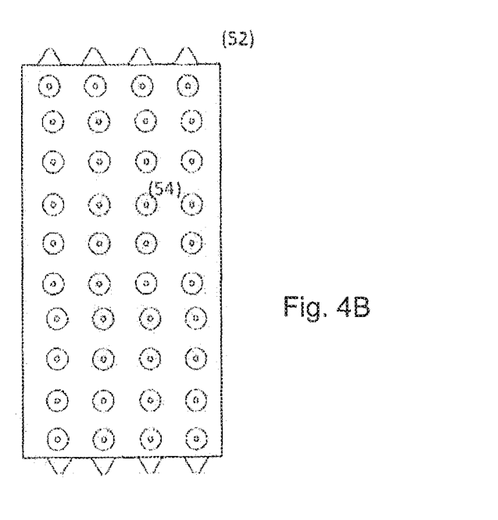

FIG. 4 shows top views of the opening parts vistas (51, 52) of an opening disposition (5) according to FIG. 3, so that one can observe in particular the distribution and form of respective opening protrusions (53).

In the case of this embodiment both opening parts (51, 52) present opening surfaces (54) each comprising a plurality of opening protrusions (53) distributed in a pattern on the opening surface (54) and disposed so as to interact with a respectively opposing package wall (23, 24) of said package (2), or single dose portion (22), so that there results a respective passageway (25).

According to a preferred embodiment, said opening protrusions (53) are disposed so as to interact with at least most part of at least one respective package wall (23, 24) of said package (2), or single dose portion (22). Moreover, the respective opening surfaces (54) present a characteristic dimension, in particular a width that corresponds at least to a respective characteristic dimension, in particular a width, of said packages (2).

As illustrated, the opening protrusions (53) can be configured different, including with a different format and/or relative dimension, because the flow characteristics on the entry-side of the package (2), or single dose portion (22), that is on a first package wall (23), can be required to be different from the flow characteristics on the exit-side, that is on a second package wall (24). In particular, some of the opening protrusions (53)—for example as those represented on a first opening part (51)—can be provided so as to perforate at least one of the package walls (23, 24), eventually one relating to the flow entry-side, whereas other opening protrusions (53)—for example as those represented on a second opening part (52)—can be provided so as to provoke the rupture and/or weakening of material zones previously provided on a package wall (23, 24), eventually in one relating to the flow exit-side.

Figure 5:
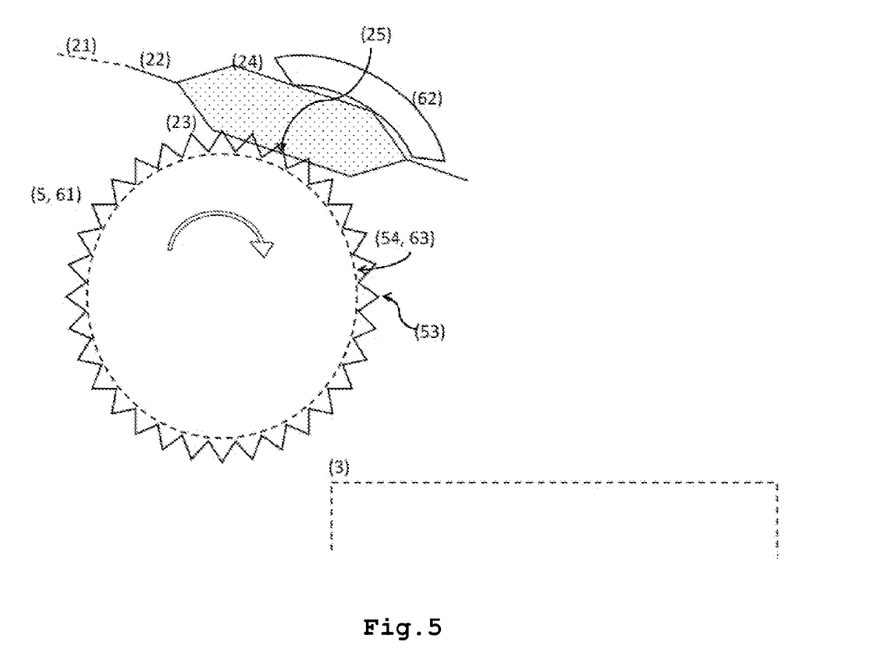
FIG. 5: side view of a second embodiment of an opening device (5) in a machine (1) for preparing beverages according to the invention.

FIG. 5 shows a second embodiment of a machine (1) for preparing beverages according to the present invention, that presents an opening disposition (5) provided integrated on the actuation device (6) disposed upstream of said extraction device (3)—only partially represented and as mere indication of its relative position. In this case, it is a side view of part of a machine (1) for preparing beverages so that the axis of rotation of said actuation device (6) develops transversally relative to the depth direction of the machine (1).

As one can observe, said actuation device (6) is provided with an opening surface (54) on the exterior perimeter surface that operates as traction element of a strip-like support (21) of single portions, thereby displacing successive single dose portions (22) from a substantially horizontal direction upstream of the actuation device (6) to a substantially vertical direction downstream, before each single dose portion (22) falls under the action of the gravity force inside of a respective extraction device (3).

Said opening surface (54) presents a plurality of opening protrusions (53) adapted so as to interact with a first package wall (23) of the successive single dose portions (22) as the latter are displaced along part of the periphery of said actuation device (6).

As it shall be readily understood by an expert in the field, said interaction between the opening protrusions (53) and a respective first package wall (23) contributes to improve the traction effect, that is the movement transmission by said actuation device (6), thereby enhancing the operation reliability of the machine (1) for preparing beverages.

Moreover, according to a preferred embodiment, it is further provided a back-pressure element (62) disposed so as to exert a back-pressure upon a second package wall (24) on the opposite side and as said single dose portion (22) is displaced through the space in-between relative to the actuation device (6), so as to reinforce the interaction of the opening protrusions (53) with said first package wall (23).

According to a preferred embodiment, said actuation device (6) further comprises a second actuation part (62) provided at a distance and developing along part of the exterior perimeter of said first actuation part (61), thereby defining a space in-between both from which there results a back-pressure upon said packages (2) of the support (21) of single portions.

As one can observe, said first actuation part (61) said actuation device (6) is provided with at least one actuation surface (63) that presents a plurality of opening protrusions (53) adapted for traction of a support (21) of single portions and for interaction with a respective package wall (23) so as to provide a plurality of passageways (25) thereupon.

Figure 6:
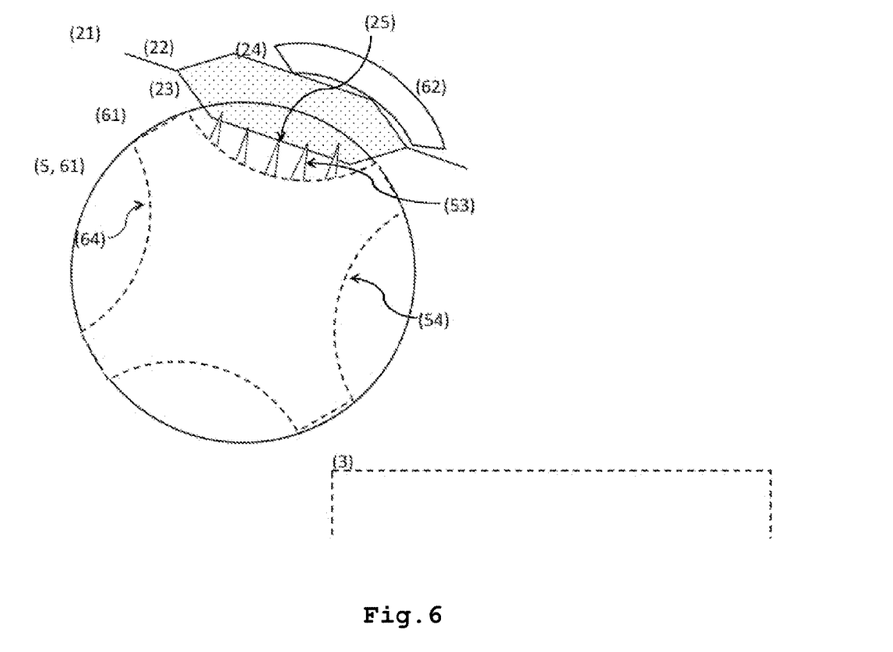
FIG. 6: side view of a third embodiment of an opening device (5) in a machine (1) for preparing beverages according to the invention.

FIG. 6 shows a third embodiment of a machine (1) for preparing beverages according to the present invention, that presents an opening disposition (5) provided integrated in said actuation device (6) disposed upstream of said extraction device (3), in a view similar to that of FIG. 5.

As one can observe, said actuation device (6) presents a first actuation part (61) provided in form of circular drum so that it is actuated in rotation around a substantially horizontal axis and so that it comprises said opening disposition (5), in particular a plurality of opening protrusions (53) provided on a respective perimeter surface.

As one can observe, said actuation device (6) in this case presents a plurality of collection zones (64) along its perimeter, provided as recesses relative to the actuation surface (63) and configured so as to engage in surface with the single dose portion (22) of said support (21) of single doses. In particular, said collection zones (64) comprise respective opening surfaces (54) that present a plurality of opening protrusions (53) adapted for traction of a support (21) of single portions and for interaction with a respective package wall (23) so as to provide a plurality of passageways (25) thereon.

According to another preferred embodiment (not represented), said opening protrusions (54) are provided so that they can be displaced in a translation movement forward and backward, relative to a respective collection zone (64). In particular, such actuation disposition of the opening protrusions (54) can be carried out by means of rotation element of eccentric cross section and associated with said opening protrusions (54).

Said eccentric element is provided in the opening disposition (5) so as to actuate the opening protrusions (54), by means of its eccentric section part, in a generally outwards direction when a single dose portion (22) is collected in a respective collection zone (64), and by continuing the rotation movement, stopping their actuation with said eccentric section part, so that said opening protrusions (54) are withdrawn back relative to the surface of the collection zones (64).

Figure 7A:
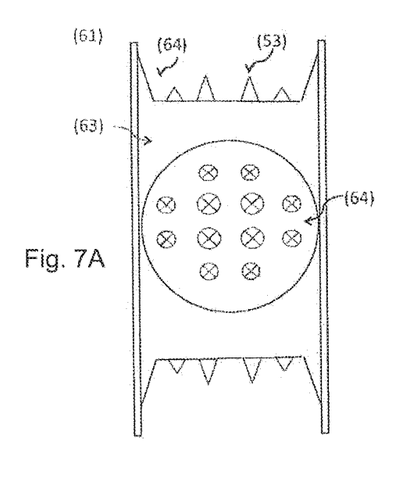
FIGS. 7*a*-7*b*: front views of the opening parts (63) of the opening disposition (5) according to FIG. 5.
Figure 7B:
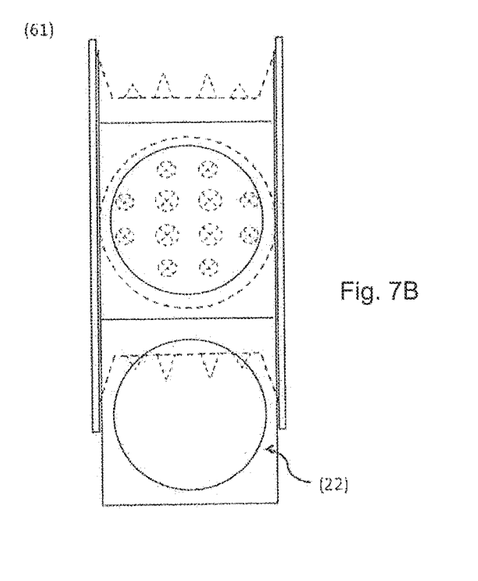

FIG. 7 shows top views of said first actuation part (61) presenting an opening disposition (5) according to FIG. 6, so that there can be observed in particular the distribution and form of respective opening protrusions (53) (on the left) and a respective engagement with single dose portions (22) provided in a support (21) of single portions (on the right).

As referred above, said actuation device (6) is provided with at least one actuation surface (63) along its perimeter that presents at least one collection zone (64) configured so as engage in surface with the single dose portion (22) of said support (21) of single portions.

According to another preferred embodiment, the step of rotation of the actuation device (6) in each operation cycle, is carried out in a rotation extension that corresponds to the advance of successive single dose portions (22) by one position.

Lisbon, Oct. 12, 2015.

The invention claimed is:

1. A beverage preparation machine (1) adapted for preparing beverages from single doses of at least one edible substance provided in a strip of linked single dose packages (2), said packages (2) comprising a support (21) carrying a plurality of single dose portions (22), each single dose portion comprising at least one first and one second package walls (23, 24) sealed so as to be substantially air tight, whereby said machine (1) comprises:
  at least one extraction device (3) adapted so that said at least one extraction device can collect one of said single dose packages (2) from said strip inside thereof,
  an opening device (5) disposed upstream of said extraction device (3) along the supply direction of said strip, and adapted so as to provide a plurality of passageways (25) in at least one of said first and second package walls (23, 24) of said single dose portions (22),
  wherein said opening device (5) comprises at least one opening part (51, 52) that presents a plurality of opening protrusions (53) disposed along a respective perimeter surface and adapted so as to provide said plurality of passageways (25), and
  wherein said opening part (51, 52) is provided so that said opening part can be actuated in rotation around a substantially horizontal or vertical axis and disposed so that said opening part can produce said passageways (25).

2. The machine (1) according to claim 1, wherein said opening device (5) is provided so that said single dose portion (22) passes by said at least one opening part (51, 52) at least in part along the general direction of the gravity force, so that said single dose portion (22) can be supplied to said opening device (5) along any direction and can be supplied downstream to said extraction device (3) along a substantially vertical direction.

3. The machine (1) according to claim 1, wherein said at least one opening part (51, 52) is provided in a general cylindrical form comprising at least one opening surface (54) along a respective perimeter surface that presents a plurality of opening protrusions (53) adapted so as to interact with at least part of a respective first or second package wall (23, 24) of said single dose portion (22).

4. The machine (1) according to claim 1, wherein said opening device (5) comprises two opening parts (51, 52) that are disposed in direct opposition and at a distance in-between so that said single dose portion (22) can pass in-between said opening parts and so that at least one opening part can be rotated around a respective axis or be displaced along an axis.

5. The machine (1) according to claim 1, wherein said opening protrusions (53) present a free edge adapted to perforate and/or provoke the rupture of said package walls (23, 24) thereby producing said passageways (25), whereby said opening protrusions (53) are configured with an elongated form of cylindrical, conic or frusto-conic type.

6. The machine (1) according to claim 1, wherein said opening protrusions (53) are substantially disposed in a pattern, including a pattern of matrix type, including of orthogonal or radial matrix type, or similar, developing continuously along an opening surface (54) or in groups in respective opening surfaces (54), whereby said opening protrusions (53) are configured with similar or different dimension and/or form forma.

7. The machine (1) according to claim 1, further comprising at least one storage for said strip comprising a plurality of single dose portions (22) provided successively along said support (21) of single doses so that said strip can be physically divided in respective single dose portions (22).

8. A beverage preparation machine (1) adapted for preparing beverages from single doses of at least one edible substance provided in a strip of linked single dose packages (2), each of said packages (2) comprising a support (21) carrying a plurality of single dose portions (22), each single dose portion comprising at least one first and one second package walls (23, 24) sealed so as to be substantially air tight, whereby said machine (1) comprises:
  at least one extraction device (3) adapted so that said at least one extraction device (3) can collect one said single dose package (2) from said strip inside thereof,
  an opening device (5) disposed upstream of said extraction device (3) along the supply direction of said strip, and adapted so as to provide a plurality of passageways (25) in at least one of said first and second package walls (23, 24) of said single dose portions (22),
  wherein said opening device (5) comprises at least one opening part (51, 52) that presents a plurality of opening protrusions (53) disposed along a respective perimeter surface and adapted so as to provide said plurality of passageways (25),
  wherein said opening part (51, 52) is provided so that it can be actuated in rotation around a substantially horizontal or vertical axis and disposed so that it can produce said passageways (25), and
  wherein said machine (1) further presents at least one actuation device (6) disposed upstream of said extraction device (3) and adapted so that said at least one actuation device (6) can move, by means of traction, said support (21) of single doses presenting a plurality of said single dose portions (22) and thereby successively supply said single dose portions (22) to said extraction device (3)
  whereby said actuation device (6) is disposed upstream of said opening device (5) with relation to said extraction device (3).

9. A beverage preparation machine (1) adapted for preparing beverages from single doses of at least one edible substance provided in a strip of linked single dose packages (2), each of said packages (2) comprising a support (21) carrying a plurality of single dose portions (22), each single dose portion comprising at least one first and one second package walls (23, 24) sealed so as to be substantially air tight, whereby said machine (1) comprises:
  at least one extraction device (3) adapted so that said at least one extraction device (3) can collect one said single dose package (2) from said strip inside thereof,
  an opening device (5) disposed upstream of said extraction device (3) along the supply direction of said strip, and adapted so as to provide a plurality of passageways (25) in at least one of said first and second package walls (23, 24) of said single dose portions (22),
  wherein said opening device (5) comprises at least one opening part (51, 52) that presents a plurality of opening protrusions (53) adapted so as to provide said plurality of passageways (25),
  wherein said at least one opening part (51, 52) is provided so that it can be actuated in rotation around a substantially horizontal or vertical axis and disposed so that it can produce said passageways (25), and
  wherein said opening device (5) also acts as an actuation device (6) operative to move, by means of traction, said support (21) of single doses presenting a plurality of said single dose portions (22) and thereby successively supply said single dose portions (22) to said extraction device (3),
  wherein at least one opening part (51, 52) also serves as a first actuation part (61) provided in the general form of a circular drum so that said first actuation part (61) is actuated in rotation around a substantially horizontal axis and so that said first actuation part comprises a plurality of said opening protrusions (53) provided on a perimeter surface.

10. The machine (1) according to claim 9, wherein at least one opening part (51, 52) serves as a second actuation part (62) provided at a distance from said first actuation part and disposed along part of the outside perimeter of said first actuation part (61) and thereby defining a space in-between said first and second actuation parts so that there results a back-pressure upon said single dose portions (22).

11. The machine (1) according to claim 9, wherein at least said first actuation part (61) is provided with at least one actuation surface (63) along its perimeter presenting a plurality of said opening protrusions (53) adapted for traction of said support (21) of single doses and for interacting with a respective package wall (23) so as to provide a plurality of passageways (25) thereon.

12. The machine (1) according to claim 9, said first actuation part (61) is provided with at least one actuation surface (63) along a perimeter thereof and presents a plurality of collection zones (64) along said perimeter, provided as recesses relative to the at least one actuation surface (63)

and configured so as to surface engage with the single dose portion (22) of said support (21) of single doses, whereby said collection zones (64) comprise opening surfaces (54) that have a plurality of opening protrusions (53) adapted for traction of said support (21) of single doses and for interacting with a respective package wall (23) so as to provide a plurality of passageways (25) thereon.

* * * * *